United States Patent Office 3,644,330
Patented Feb. 22, 1972

3,644,330
DERIVATIVES OF ESTRADIOL-17β-GLUCOSIDES
Wolfgang Eberlein, Biberach an der Riss, Joachim Heider, Warthausen-Oberhofen, and Hans Machleidt and Gunther Engelhardt, Biberach an der Riss, Germany, assignors to Boehringer Ingelheim G.m.b.H., Ingelheim am Rhein, Germany
No Drawing. Filed May 1, 1969, Ser. No. 821,557
Claims priority, application Germany, May 3, 1968, P 17 68 351.1–42
Int. Cl. C07c 173/00
U.S. Cl. 260—210.5   4 Claims

ABSTRACT OF THE DISCLOSURE

Estrogenic estradiol-17β-glucoside derivatives of the formula

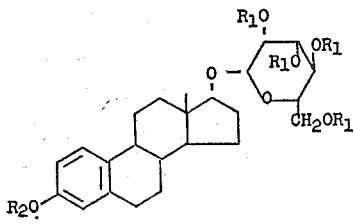

wherein $R_1$ is hydrogen or lower alkanoyl, preferably acetyl, and $R_2$ is lower alkyl, lower alkanoyl, tetrahydropyranyl, or $MeO_3S$—, where Me is an alkali metal; the compounds are useful for the treatment of the menopausal syndrome, amenorrhea, endometritis and colpitis.

This invention relates to novel derivatives of estradiol-17β-glucoside, as well as to various methods of preparing these compounds.

More particularly, the present invention relates to estradiol-17β-glucoside derivatives of the formula

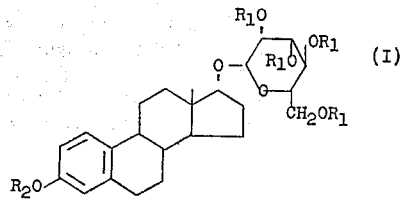

wherein $R_1$ is hydrogen or lower alkanoyl, preferably acetyl, and $R_2$ is lower alkyl, lower alkanoyl, tetrahydropyranyl, or $MeO_3S$—, where Me is an alkali metal.

The compounds of the Formula I above may be prepared by various methods involving known chemical principles, such as by the method described by Ch. Meystre and K. Miescher in Helv. Chim. Acta 27, 231, 1153 (1944).

METHOD A

For the preparation of a compound of the Formula I wherein $R_1$ has the meanings defined above and $R_2$ has the same meanings as in Formula I except $MeO_3S$—, by reacting a compound of the formula

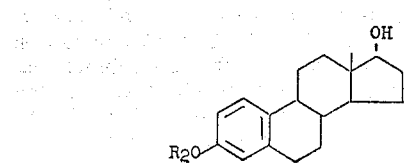

wherein $R_2$ has the same meanings as in Formula I except $MeO_3S$—, with a tetra-O-acyl-α-D-glucopyranosyl halide of the formula

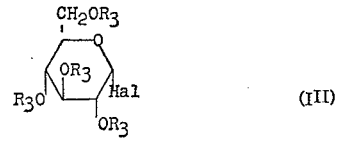

wherein $R_3$ is lower alkanoyl and Hal is halogen.

The reaction is carried out in the presence of a heavy metal salt or a heavy metal oxide and preferably in an inert organic solvent, such as benzene, and most advantageously at the boiling point of the solvent. Preferred examples of a heavy metal salt are oxides, cyanides or carbonates of silver or mercury. The preferred manner of performing the reaction is to admix a solution of a compound of the Formula II in the solvent with a suspension of the heavy metal salt or heavy metal oxide in the solvent, heat the resulting mixture to the boiling point of the solvent, and add a solution of the tetra-O-acyl-α-D-glucopyranosyl halide in the solvent dropwise to the boiling mixture while distilling off a portion of the solvent azeotropically.

METHOD B

By alkylating or acylating a compound of the formula

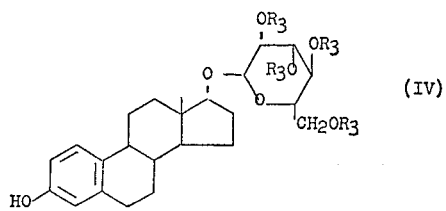

wherein $R_3$ is lower alkanoyl, at the phenolic hydroxyl group in the 3-position with a conventional alkylating or acylating agent.

If $R_2$ in Formula I is to be lower alkanoyl, the compound of the Formula IV is acylated by conventional methods with a lower ankanoyl halide. If $R_2$ in Formula I is to be lower alkyl, the compound of the Formula IV is alkylated pursuant to conventional methods with a di-lower alkyl sulfate or a lower alkyl halide in the presence of an acid-binding agent. If $R_2$ in Formula I is to be tetrahydropyranyl, the compound of the Formula IV is reacted with diphydropyran in the presence of an aromatic sulfonic acid. Finally, if $R_2$ in Formula I is to be $MeO_3S$—, the compound of the Formula IV is reacted with amidosulfonic acid in an inert organic solvent and in the presence of a tertiary organic base. The tertiary organic base, such as pyridine, may also simultaneously serve as the solvent medium if it is provided in sufficient excess over and above the stoichiometrically required amount. Subsequently, the sulfuric acid semiester formed thereby is transformed into the desired alkali metal salt by treatment with alkali metal hydroxide, such as methanolic sodium hydroxide or potassium hydroxide. During this sulfation of the hydroxyl group in the 3-position the acyl radicals $R_3$ of the glucopyranosyl moiety are simultaneously split off.

If desired, those compounds of the Formula I wherein the radicals $R_1$ are lower alkanoyl which are obtained as end products in methods A and B, may subsequently be hydrolyzed pursuant to known methods. This hydrolysis may be effected with alkalies under gentle conditions at room temperature, for instance, with potassium carbonate, potassium hydroxide, sodium hydroxide or ammonia in methanolic solution, or with sodium methylate, potassium methylate or barium methylate in ethanolic solution.

On the other hand, if the above methods yield a compound of the Formula I with free hydroxyl groups attached to the glucopyranosyl moiety, for example, after sulfation of the hydroxyl group in the 3-position, these free hydroxyl groups may, if desired, be acylated pursuant to known methods, such as with an alkanoyl halide, a symmetric anhydride or a mixed anhydride of the corresponding carboxylic acid and a carbonic acid monoester. The acylation is advantageously carried out at room temperature in an inert organic solvent and preferably in the presence of an acid-binding agent, such as an inorganic or tertiary organic base.

The starting compounds of the Formulas II and IV are described in the literature.

The following examples further illustrate the present invention and will enable others skilled in the art to understand it more completely. It should be understood, however, that the invention is not limited solely to the particular examples given below.

EXAMPLE 1

(a) 3-methoxy-estra-1,3,5(10)-triene-17β-yl-2′,3′,4′,6′-tetra-O-acetyl-D-glucopyranoside by Method A A solution of 3 gm. of α-aceto-bromoglucose in 50 cc. of absolute benzene was added dropwise over a period of two hours to a mixture consisting of 1 gm. of 17β-estra-diol-3-methyl ether, 1.3 gm. of freshly precipitated silver carbonate and 50 cc. of benzene while simultaneously distilling 10 to 15 cc. of benzene out of the reaction mixture. Thereafter, the resulting reaction solution was refluxed for two hours and then evaporated to dryness in vacuo at 50° C. The residue was recrystallized several times from ethanol, yielding 800 mgm. (38% of theory) of 3-methoxy-estra-1,3,5(10)-triene-17β-yl-2′,3′,4′,6′-tetra-O-acetyl-D-glucopyranoside, M.P. 163–165° C., of the formula

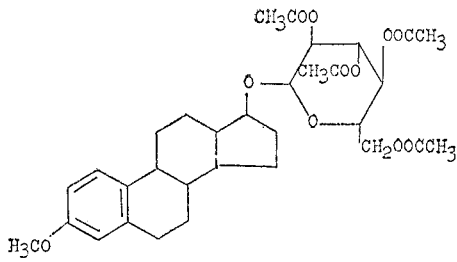

(b) 3-methoxy-estra-1,3,5(10)-triene-17β-yl-D-glucopyranoside 400 mgm. of 3-methoxy-estra-1,3,5(10)-triene-17β-yl-2′,3′,4′,6′-tetra-O-acetyl-D-glucopyranoside were dissolved in 50 cc. of methanol, and the solution was admixed with a solution of 800 mgm. of potassium carbonate in 10 cc. of water. The reaction solution was allowed to stand for two hours at room temperature and was thereafter evaporated to dryness in vacuo. The residue was recrystallized from ethanol, yielding 250 mgm. (88% of theory) of 3 - methoxy-estra-1,3,5(10)-triene-17β-yl-D-glucopyranoside, M.P. 225–228° C., of the formula

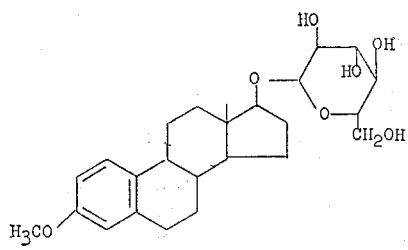

EXAMPLE 2

(a) 3-tetrahydropyranyloxy-estra-1,3,5(10)-triene-17β-yl-2′,3′,4′,6′-tetra-O-acetyl-D-glucopyranoside by method A A solution of 3 gm. of α-aceto-bromoglucose in 50 cc. of absolute benzene was added dropwise over a period of two hours to a boiling mixture consisting of 1 gm. of 17β-estradiol-3-tetrahydropyranyl-ether, 6 gm. of silver carbonate and 50 cc. of absolute benzene while simultaneously distilling 10 to 15 cc. of benzene out of the reaction mixture. The resulting reaction solution was refluxed for two hours and then evaporated to dryness in vacuo. The residue was purified by chromatography on silicagel (15% deactivated) with benzene as the flow agent to which increasing amounts of ethyl acetate were added. The purified raw product was recrystallized from ethanol, yielding 1 gm. (50% of theory) of 3-tetrahydropyranyloxy-estra-1,3,5(10)-triene-17β-yl-2′,3′,4′,6′-tetra-O-acetyl-D-glucopyranoside, M.P. 121–124° C., of the formula

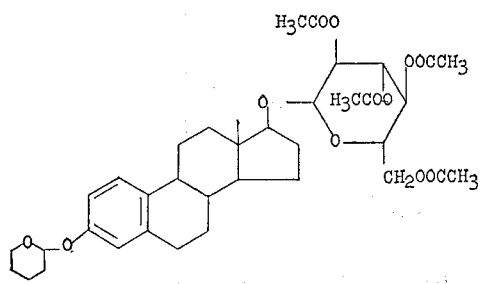

(b) 3-tetrahydropyranyloxy-estra-1,3,5(10)-triene-17β-yl-D-glucopyranoside 500 mgm. of 3-tetrahydropyranyloxy-estra-1,3,5(10)-triene - 17β - yl-2′,3′,4′,6′-tetra-O-acetyl-D-glucopyranoside were dissolved in 20 cc. of ethanol, and the solution was admixed with 20 cc. of 1 N sodium hydroxide. The reaction solution was allowed to stand at room temperature for two hours, then diluted with water and repeatedly extracted with chloroform. The chloroform extract solutions were combined, washed with an aqueous sodium bicarbonate solution and with water, and evaporated to dryness in vacuo. The residue was purified by chromatography on silicagel (15% deactivated) with a mixture of benzene and ethyl acetate as the flow agent. The purified raw product was recrystallized from ethanol, yielding 100 mgm. (25% of theory) of 3-tetrahydropyranyloxy-estra - 1,3,5(10) - triene-17β-yl-D-glucopyranoside, M.P. 165–168° C., of the formula

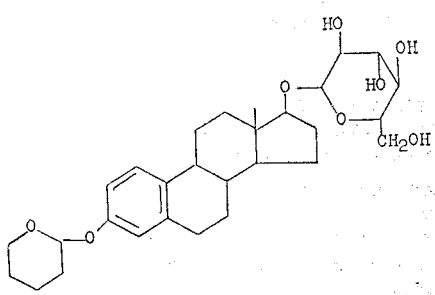

EXAMPLE 3

(a) Potassium 3-sulfoxy-estra-1,3,5(10)-triene-17β-yl-D-glucopyranoside by method B 1 gm. of 3-hydroxy-estra-1,3,5(10)-triene-17β-yl-2′,3′,4′,6′-tetra-O-acetyl-D-glucopyranoside and 0.48 gm. of amidosulfonic acid were dissolved in 6 cc. of pyridine, and the solution was stirred at 90° C. for 90 minutes in an atmosphere of nitrogen. Thereafter, the solution was allowed to cool, 50 cc. of ether were added, and the precipitate formed thereby was filtered off and dried. The raw product, which was contaminated with inorganic sulfate, was extracted several times with methylene chloride, and the combined extract solutions were evaporated to dryness in vacuo at 30° C. The residue was dissolved in a mixture consisting of 50 cc. of methanol and 8 cc. of methanolic 12% potassium hydroxide, and the resulting solution was stirred for one hour at room temperature. Thereafter, 300 cc. of ether were added to the solution, and the precipitate formed thereby was collected and freed from inorganic impurities by chromatography on silicagel (15% deactivated). 350 mgm. (38% of theory) of potassium 3-sulfoxy-estra-1,3,5(10)-triene-17β-yl-D-glucopyranoside, M.P. 206° C. (sintering), 211° C. (decomp.), of the formula

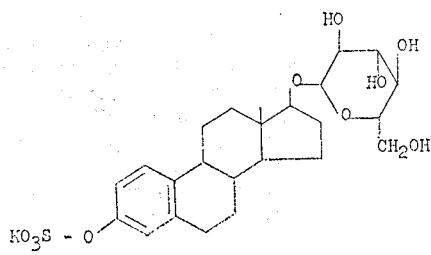

were obtained.

(b) Potassium 3-sulfoxy-estra-1,3,5(10)-triene-17β-yl-2′,3′,4′,6′-tetra-O-acetyl-D-glucopyranoside A solution of 1 gm. of potassium 3-sulfoxy-estra-1,3,5 (10)-triene-17β-yl-D-glucopyranoside in 15 cc. of pyridine and 15 cc. of acetic acid anhydride was allowed to stand overnight at room temperature. Thereafter, 400 cc. of ether were added, and the precipitate formed thereby was collected by vacuum filtration. The filter cake was subjected to chromatography on silicagel (15% deactivated) with chloroform as the flow agent, to which increasing amounts of ethanol were added. The purified product was recrystallized from methanol/ether. 800 mgm. (56% of theory) of potassium 3-sulfoxy-estra-1,3,5(10)-triene-17β-yl-2′,3′,4′,6′-tetra-O-acetyl-D-glucopyranoside, M.P. 132° C. (decomp.), of the formula

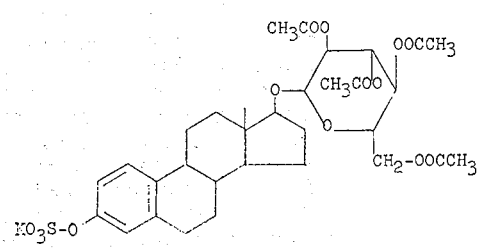

were obtained.

EXAMPLE 4

3-acetoxy-estra-1,3,5(10)-triene-17β-yl-2′,3′,4′,6′-tetra-O-acetyl-D-glucopyranoside by method B 150 mgm. of 3-hydroxy-estra-1,3,5(10)-triene-17β-yl-2′,3′,4′,6′-tetra-O-acetyl - D - glucopyranoside were dissolved in 1 cc. of pyridine, and the solution was admixed with 1 cc. of acetic acid anhydride. The mixture was allowed to stand overnight at room temperature, and then it was poured into 150 cc. of water. The aqueous mixture was extracted several times with chloroform, and the chloroform extracts were combined, washed with 2 N hydrochloric acid, aqueous sodium bicarbonate and water, dried over sodium sulfate and evaporated to dryness in vacuo. The residue was recrystallized from ethanol/petroleum ether, yielding 130 mgm. (81% of theory) of 3-acetoxy-estra-1,3,5(10)-triene-17β-yl-2′,3′,4′,6′-tetra-O-acetyl-D-glucopyranoside, M.P. 168–170° C., of the formula

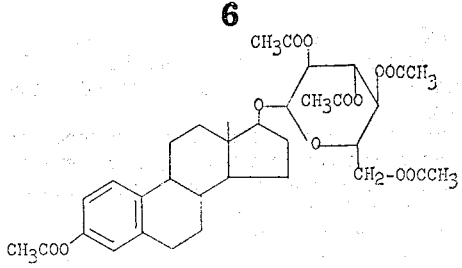

The compounds according to the present invention, that is, those embraced by Formula I above, have useful pharmacodynamic properties. More particularly, the compounds of the present invention exhibit estrogenic activity in warm-blooded animals, such as rats, and are therefore useful for the therapeutic treatment of the menopausal syndrome. Moreover, they can be used for gynecological indications, such as for the treatment of primary or secondary amenorrhea, endometritis and colpitis. Furthermore, in combination with a gestagen, the compounds of the present invention produce a hormonal contraceptive effect.

The estrogenic activity of the compounds according to the present invention was ascertained and compared with that of estrone sulfate, using in principle the standard test method of Dorfman and Dorfman, Endocrinology 55, 65 (1954): Infantile female laboratory rats, 21 to 23 days old, with an average body weight of 38 gm. at the beginning of the test, received a single peroral dose of the compound under investigation in aqueous solution by means of an esophageal sound. Equimolar doses of the compounds were administered, each dose corresponding to 0.1 mgm./kg. of estrone sulfate. Control animals were administered an equal volume of the vehicle only in the same manner.

48 hours after this peroral administration the rats were sacrificed by ether inhalation, and their uteri were excised from the ovaries to the vagina. After squeezing out the secreted fluids, the moist weight of each uterus was determined.

The increase in the weight of the uterus of the animals treated with the compound under investigation over the weight of the uterus taken from the placebo-treated control animals served as a measure of the estrogenic activity.

The following table shows the results obtained with two representative members of the genus represented by Formula I, namely:

(A) 3-tetrahydropyranyloxy-estra-1,3,5(10)-triene - 17β-yl-β-D-glucopyranoside, and
(B) Potassium 3-sulfoxy-estra-1,3,5(10)-triene - 17β-yl-β-D-glycopyranoside.

TABLE

| Compound | No. of animals | Weight of uterus in mgm. | | Increase in weight of uterus in— | |
|---|---|---|---|---|---|
| | | Average | Standard deviation | Mgm. | Percent over controls |
| A | 20 | 34.4 | 1.0 | 12.7 | 58.5 |
| Controls | 20 | 21.7 | 0.9 | 0 | 0 |
| B | 20 | 37.8 | 1.5 | 17.9 | 89.9 |
| Controls | 20 | 19.9 | 1.1 | 0 | 0 |
| Estrone sulfate | 20 | 30.9 | 1.2 | 10.0 | 47.8 |
| Controls | 20 | 20.9 | 0.6 | 0 | 0 |

Analogous results were obtained with the other compounds embraced by Formula I.

For pharmaceutical purposes the compounds according to the present invention are administered to warm-blooded animals perorally as active ingredients in customary dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like.

One effective dosage unit of the compounds according to the present invention is from 0.00083 to 0.0167 mgm./kg. body weight, preferably 0.00125 to 0.005 mgm./kg. body weight.

In addition to a compound of the present invention, such dosage unit compositions may also contain an effective dosage unit of one or more other active ingredients, such as a tranquilizer or a gestagen.

The following examples illustrate a few dosage unit compositions comprising a compound of the instant invention as an active ingredient and represent the best mode contemplated of putting the invention to practical use. The parts are parts by weight unless otherwise specified.

EXAMPLE 5

Coated pills

The pill core composition was compounded from the following ingredients:

| | Parts |
|---|---|
| 3-tetrahydropyranyloxy - estra - 1,3,5,(10) - triene-17-$\beta$-yl-$\beta$-D-glucopyranoside | 0.3 |
| Secondary calcium phosphate | 37.2 |
| Corn starch | 10.0 |
| Polyvinylpyrrolidone | 2.0 |
| Cellulose, microcrystalline | 5.0 |
| Magnesium stearate | 0.5 |
| Total | 55.0 |

Compounding procedure: The estradiol-17$\beta$-glucoside compound was intimately admixed with the calcium phosphate, the mixture was combined with the corn starch, and the resulting mixture was granulated with an aqueous 10% solution of the polyvinylpyrrolidone through a 1 mm.-mesh screen. The granulate was dried at 40° C., again passed through the screen, and then admixed with the remaining ingredients. The finished composition was compressed into 55 mgm.-pill cores, which were then coated with a thin shell consisting essentially of sugar and talcum, and the coated pills were polished with beeswax. Each pill contained 0.3 mgm. of the estradiol-17$\beta$-glucoside compound and, when administered perorally to a warm-blooded female animal of about 60 kg. body weight in need of such treatment, produced very good estrogenic effects.

EXAMPLE 6

Coated pills with combination of estrogenic and progestational agents

The pill core composition was compounded from the following ingredients:

| | Parts |
|---|---|
| Potassium - 3 - sulfoxy-estra-1,3,5(10)-triene-17$\beta$-yl-$\beta$-D-glucopyranoside | 0.075 |
| 17-hydroxy - 19 - nor - 17$\alpha$-pregn-5(10)-ene-20-yn-3-one (norethylnodrel) | 3.0 |
| Secondary calcium phosphate | 34.425 |
| Corn starch | 10.0 |
| Polyvinylpyrrolidone | 2.0 |
| Cellulose, microcrystalline | 5.0 |
| Magnesium stearate | 0.5 |
| Total | 55.0 |

The coated pills were manufactured in a manner analogous to that described in Example 5. Each coated pill contained 0.075 mgm. of estradiol-17$\beta$-glucoside compound and 3.0 mgm. of norethynodrel and, when administered perorally to a warm-blooded female animal of about 60 kg. body weight, produced contraceptive effects.

EXAMPLE 7

Tablets

The tablet composition was compounded from the following ingredients:

| | Parts |
|---|---|
| Potassium - 3 - sulfoxy-estra-1,3,5(10)-triene-17$\beta$-yl-$\beta$-D-glucopyranoside | 1.0 |
| Lactose | 84.0 |
| Potato starch | 30.0 |
| Polyvinylpyrrolidone | 4.0 |
| Magnesium stearate | 1.0 |
| Total | 120.0 |

Compounding procedure: The estradiol-17$\beta$-glucoside compound was intimately admixed with the lactose and the potato starch, the mixture was granulated with an ethanolic 15% solution of the polyvinylpyrrolidone through a 1.5 mm.-mesh screen, the granulate was dried at 40° C. and again passed through a 1.0 mm.-mesh screen, the dry granulate was admixed with the magnesium stearate, and the composition was compressed into 120 mgm.-tablets. Each tablet contained 1.0 mgm. of the estradiol-17$\beta$-glucoside compound and, when administered perorally to a warm-blooded female animal of about 60 kg. body weight in need of such treatment, produced very good estrogenic effects.

EXAMPLE 8

Coated pills with combination of estrogenic agent (in coating) and tranquilizer (in core)

The pill core composition was compounded from the following ingredients:

| | Parts |
|---|---|
| 7-chloro-1,3 - dihydro - 3 - hydroxy-5-phenyl-2H-1,4-benzodiazepin-2-one | 10.0 |
| Secondary calcium phosphate | 88.5 |
| Potato starch | 21.0 |
| Polyvinylpyrrolidone | 9.0 |
| Alginic acid | 10.5 |
| Magnesium stearate | 1.0 |
| Total | 140.0 |

Compounding procedure: The benzodiazepinone compound was granulated with an ethanolic 25% solution of the polyvinylpyrrolidone through a 1.5 mm.-mesh screen, the granulate was dried at 40° C., again passed through a 1.0 mm.-mesh screen, admixed with the remaining ingredients, and the composition was compressed into 140 mgm.-pill cores. The cores were then coated with a thin shell consisting essentially of talcum and sugar. Thereafter, the coated pills were provided with another exterior shell consisting of a sufficient quantity of a powdery mixture of talcum and 10% by weight of 3-tetrahydropyranyloxy-estra-1,3,5(10) - triene-17$\beta$-yl-$\beta$-D-glucopyranoside to add 0.3 mgm. of the latter to each coated pill; the second shell was applied with the aid of an aqueous gum arabic-sugar solution. Finally, double-coated pills were polished with beeswax. Each pill contained 0.3 mgm. of the estradiol-17$\beta$-glucoside compound and 10.0 mgm. of the benzodiazepinone compound and, when administered perorally to a warm-blooded female animal of about 60 kg. body weight in need of such treatment, produced very good estrogenic and tranquilizing effects.

Analogous results were obtained when an equal amount of any one of the other compounds embraced by Formula I above was substituted for the particular estradiol-17$\beta$-glucoside compounds in Examples 5 to 7. Likewise, the amount of active ingredient in these examples may be varied to achieve the dosage unit range set forth above, and the amounts and nature of the inert pharmaceutical carrier ingredients may be varied to meet particular requirements.

We claim:
1. A compound of the formula

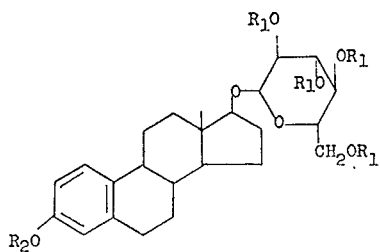

wherein $R_1$ is hydrogen or acetyl, and
$R_2$ is methyl, acetyl, tetrahydropyranyl or $KO_3S—$.

2. A compound according to claim 1, wherein $R_1$ is hydrogen and $R_2$ is $KO_3S—$.
3. A compound according to claim 1, wherein $R_1$ is hydrogen and $R_2$ is methyl.
4. A compound according to claim 1, wherein $R_1$ is hydrogen and $R_2$ is tetrahydropyranyl.

References Cited
UNITED STATES PATENTS

| | | | |
|---|---|---|---|
| 3,275,624 | 9/1966 | Cantrall et al. | 260—210.5 |
| 3,449,321 | 6/1969 | Joseph et al. | 260—210.5 |

LEWIS GOTTS, Primary Examiner

J. R. BROWN, Assistant Examiner

U.S. Cl. X.R.

424—182